United States Patent
Francois et al.

(10) Patent No.: US 11,647,188 B2
(45) Date of Patent: May 9, 2023

(54) INVERSE MAPPING SIMPLIFICATION

(71) Applicant: InterDigital VC Holdings, Inc., Wilmington, DE (US)

(72) Inventors: Edouard Francois, Cesson-Sevigne (FR); Christophe Chevance, Cesson-Sevigne (FR); Franck Hiron, Cesson-Sevigne (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/294,166

(22) PCT Filed: Dec. 16, 2019

(86) PCT No.: PCT/US2019/066494
§ 371 (c)(1),
(2) Date: May 14, 2021

(87) PCT Pub. No.: WO2020/142186
PCT Pub. Date: Jul. 9, 2020

(65) Prior Publication Data
US 2022/0007018 A1 Jan. 6, 2022

(30) Foreign Application Priority Data

Jan. 4, 2019 (EP) ..................................... 19305013
Jan. 8, 2019 (EP) ..................................... 19305018
Feb. 22, 2019 (EP) ..................................... 19305213

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/132* (2014.11); *H04N 19/176* (2014.11); *H04N 19/46* (2014.11)

(58) Field of Classification Search
CPC ........ H04N 19/46; H04N 19/70; H04N 19/85; H04N 19/119; H04N 19/132; H04N 19/176
See application file for complete search history.

(56) References Cited

U.S. PATENT DOCUMENTS 10,778,979 B2 * 9/2020 Ramasubramonian ..................... H04N 19/124
11,018,854 B2 * 5/2021 Fernandez ............... H04L 9/14
(Continued)

FOREIGN PATENT DOCUMENTS

WO    WO2019006300 A1    1/2019

OTHER PUBLICATIONS

Francois, "CE12-related: in loop reshaping with approximate inverse mapping function", Document: JVET-M0640, Joint Video Exploration Team of ISO/IEC JTC1/SC29/WG11 and ITU-T SG.16, pp. 1-11, Jan. 11, 2019.*

(Continued)

*Primary Examiner* — Tsion B Owens
(74) *Attorney, Agent, or Firm* — Xiaoan Lu

(57) ABSTRACT

Reshaping can be used to better exploit the sample value distribution of video data. When reshaping is used inside the coding loop, forward mapping is applied to prediction signals from intra or inter prediction, and inverse mapping is applied to reconstructed signals. To simplify the inverse mapping operations, in one embodiment, the inverse mapping function is modelled as a piece-wise linear function, and each line segment is defined on an equi-distant interval of a length equal to a power of 2. In this embodiment, the (Continued)

inverse mapping function is specified by the number of pieces, initial offset value and the slope for each piece. In one example, the slope parameters can be signaled directly in the bitstream. In another example, an initial estimate of the slope parameters can be obtained from the forward mapping function, and the difference between the initial estimate and the actual parameters are signaled.

20 Claims, 8 Drawing Sheets

(51) Int. Cl.
  *H04N 19/132* (2014.01)
  *H04N 19/46* (2014.01)

(56) References Cited

U.S. PATENT DOCUMENTS

| | | | | |
|---|---|---|---|---|
| 2018/0278967 A1* | 9/2018 | Kerofsky | ............. | H04N 19/186 |
| 2019/0079554 A1* | 3/2019 | Galpin | ................. | H04N 19/463 |
| 2020/0267392 A1* | 8/2020 | Lu | ........................ | H04N 19/159 |
| 2021/0029361 A1* | 1/2021 | Lu | ........................ | H04N 19/182 |
| 2021/0211738 A1* | 7/2021 | Yin | ........................ | H04N 19/46 |

OTHER PUBLICATIONS

Rosewarne et al., "High Efficiency Video Coding (HEVC) Test Model 16 (HM16) Encoder Description Update 9", Document: JCTVC-AB1002, Joint Collaborative Team on Video Coding (JCT-VC) of ITU-T SG16 WP3 and IS/IEC JTC1/SC29/WG11, 28th Meeting: Torino, IT, pp. 1-70, Jul. 15-21, 2017.

Lu et al., "CE12-related: Universal low complexity reshaper for SDR and HDR video", Document: JVET-L0247, Joint Video Experts Team (JVET) of ITU-T SG 16 WP 3 and ISO/IEC JTC 1/SC 29/WG 11, 12th Meeting: Macao, CN, pp. 1-10, Oct. 3-12, 2018.

Ye et al., "Improvements to Bit Depth Scalability Coding", Document: JVT-Y048, Joint Video Team (JVT) of ISO/IEC MPEG & ITU-T VCEG (ISO/IEC JTC1/SC29/WG11 and ITU-T SG16 Q.6), 25th Meeting: Shenzhen, CN, pp. 1-8, Oct. 21-26, 2007.

Francois et al., "CE12-related: in loop luma reshaping with approximate inverse mapping function", Document: JVET-M0640, Joint Video Expert Team (JVET) of ITU-T SG 16 WP 3 and ISO/IEC JTC 1/SC 29/WG 11, 13th Meeting: Marrakech, MA, pp. 1-6, Jan. 9-18, 2019.

* cited by examiner (a)

(b)

INVERSE MAPPING SIMPLIFICATION

This application claims the benefit, under 35 U.S.C. § 371 of International Application No. PCT/US2019/066494, filed Dec. 16, 2019, which was published on Jul. 9, 2020, which claims the benefit of European Patent Application Nos. EP19305013.5 filed Jan. 4, 2019, EP19305018.4 filed Jan. 8, 2019 and EP19305213.1 filed Feb. 22, 2019.

TECHNICAL FIELD

The present embodiments generally relate to a method and an apparatus for video encoding or decoding, and more particularly, to a method and an apparatus for simplifying the inverse mapping in video data reshaping.

BACKGROUND

To achieve high compression efficiency, image and video coding schemes usually employ prediction and transform to leverage spatial and temporal redundancy in the video content. Generally, intra or inter prediction is used to exploit the intra or inter picture correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

According to an embodiment, a method of video encoding or decoding is provided, comprising: performing forward mapping, based on a forward mapping function, to a prediction sample corresponding to a sample of a block of a picture; and performing inverse mapping, based on an inverse mapping function, to a reconstructed version of said sample of said block, wherein said inverse mapping function is an approximation of an inverse function of said forward mapping function, wherein said inverse mapping function is modelled as a piece-wise linear function, and wherein each piece in said piece-wise linear model is defined with a same interval length.

According to another embodiment, an apparatus for video encoding or decoding is provided, comprising one or more processors, wherein said one or more processors are configured to: perform forward mapping, based on a forward mapping function, to a prediction sample corresponding to a sample of a block of a picture; and perform inverse mapping, based on an inverse mapping function, to a reconstructed version of said sample of said block, wherein said inverse mapping function is an approximation of an inverse function of said forward mapping function, wherein said inverse mapping function is modelled as a piece-wise linear function, and wherein each piece in said piece-wise linear model is defined with a same interval length. The apparatus may further comprise one or more memories coupled to said one or more processors.

According to another embodiment, an apparatus of video encoding or decoding is provided, comprising: means for performing forward mapping, based on a forward mapping function, to a prediction sample corresponding to a sample of a block of a picture; and means for performing inverse mapping, based on an inverse mapping function, to a reconstructed version of said sample of said block, wherein said inverse mapping function is an approximation of an inverse function of said forward mapping function, wherein said inverse mapping function is modelled as a piece-wise linear function, and wherein each piece in said piece-wise linear model is defined with a same interval length.

According to another embodiment, a signal comprising encoded video is formed by performing: performing forward mapping, based on a forward mapping function, to a prediction sample corresponding to a sample of a block of a picture; and performing inverse mapping, based on an inverse mapping function, to a reconstructed version of said sample of said block, wherein said inverse mapping function is an approximation of an inverse function of said forward mapping function, wherein said inverse mapping function is modelled as a piece-wise linear function, and wherein each piece in said piece-wise linear model is defined with a same interval length.

DETAILED DESCRIPTION

For better coding efficiency, signal mapping may be used. Mapping (also known as reshaping) aims at better exploiting the sample value distribution of the video pictures. The mapping and inverse mapping can be out of the decoding loop. In this case the mapping directly applies to the input samples of the encoder, prior to the core encoding. The inverse mapping process applies at the decoder side to the output samples from the decoder. The mapping and inverse mapping can also be in the decoding loop, for example, as proposed in JVET-L0247 (see Taoran Lu et al., "CE12-related: Universal low complexity reshaper for SDR and HDR video," JVET 12th Meeting, Macao, CN, Oct. 3-12, 2018, JVET-L0247-v2, hereinafter "JVET-L0247").

Figure 1:
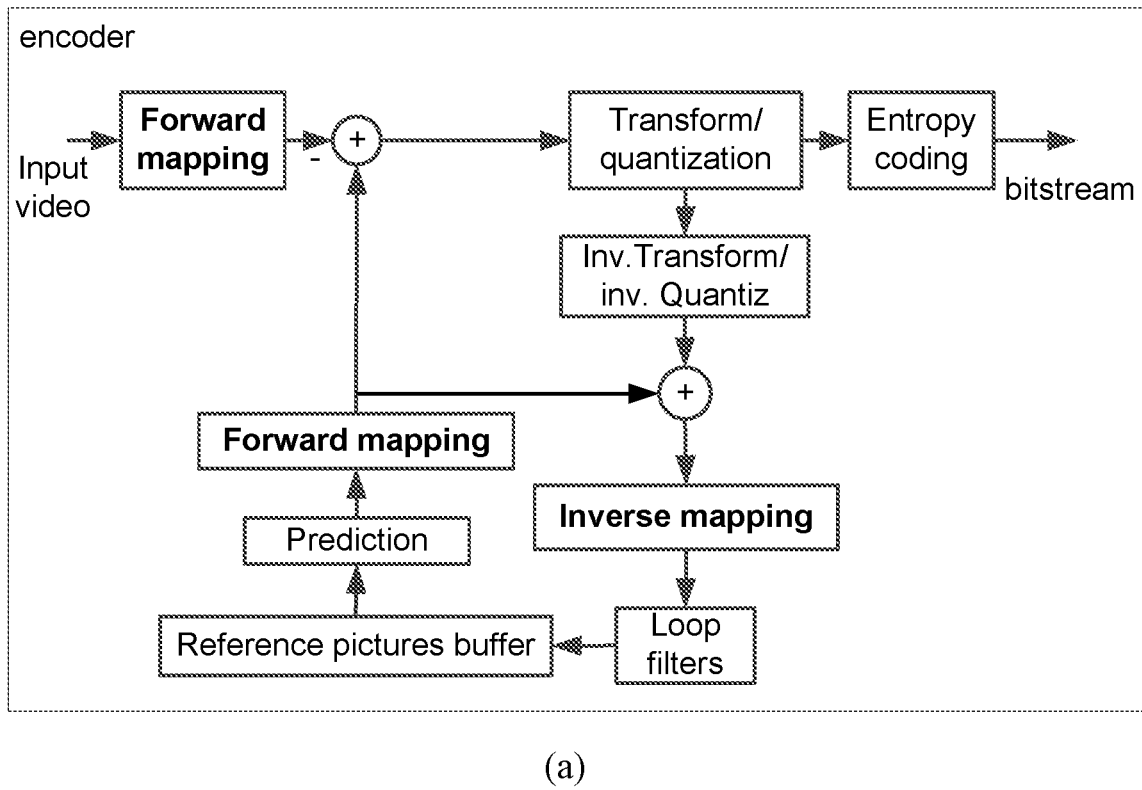
FIG. 1(a) and FIG. 1(b) illustrate video data reshaping in the encoder and decoder, respectively.
Figure 1:
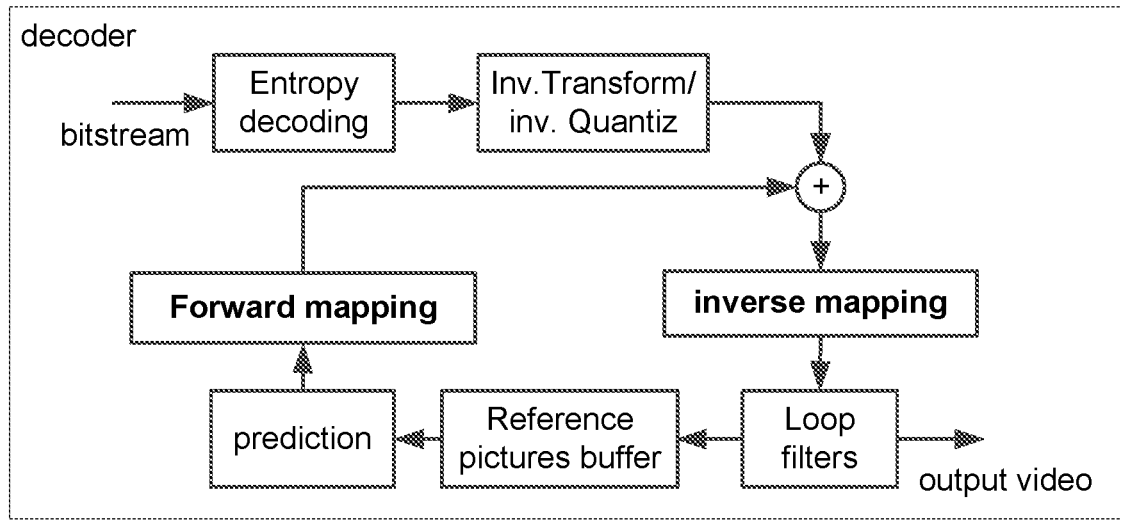

JVET-L0247 describes in-loop mapping solutions to improve coding efficiency. In this solution, a mapping of the luma or chroma signal is achieved internally in the coding loop. The mapping applies to the prediction signal, and in the encoder or decoder, additional blocks of mapping and inverse mapping are added to the conventional encoder and decoder block diagrams. This is illustrated in FIG. 1 where the forward mapping is applied to the prediction luma or chroma signal.

At the encoder, the residual signal before transform and quantization, Res_source, is generated according to the following formula:

$$\text{Res\_source}(p) = \text{fwdMap}[\text{Orig}(p)] - \text{fwdMap}[\text{Pred}(p)] \quad \text{(eq. 1)}$$

where Orig(p) is the value of the source sample (to be coded) at location p(x,y) in the picture, Pred(p) is the value of the prediction sample, and Res_source(p) is the value of the prediction residual sample before transform and quantization, and fwdMap[.] is the mapping function. Res_source(p) is then transformed and quantized. The inverse quantized and inverse transformed residual signal is noted Res(p).

At the decoder, the signal is reconstructed according to the following formula (shown in FIG. 1(b)):

$$\text{Rec}(p) = \text{invMap}[\text{fwdMap}[\text{Pred}(p)] + \text{Res}(p)] \quad \text{(eq. 2)}$$

The reconstruction is implemented as follows:
forward mapping:

$$\text{Rec0}(p) = \text{fwdMap}[\text{Pred}(p)] \quad \text{(eq. 3)}$$

summing up:

$$\text{Rec1}(p) = \text{Rec0}(p) + \text{Res}(p) \quad \text{(eq. 4)}$$

inverse mapping:

$$\text{Rec}(p) = \text{invMap}[\text{Rec1}(p)] \quad \text{(eq. 5)}$$

where Rec(p) is the value of the reconstructed sample, invMap[.] is the inverse mapping function (inverse of fwdMap[.] such that invMap[fwdMap[x]]=x, not considering possible rounding errors). In JVET-L0247 this process is performed for each sample of the processed blocks. The functions of mapping and inverse mapping are global to the entire picture, or to areas of the picture. Among the different blocks of the picture or of the areas of blocks, the same functions are used.

Figure 2:
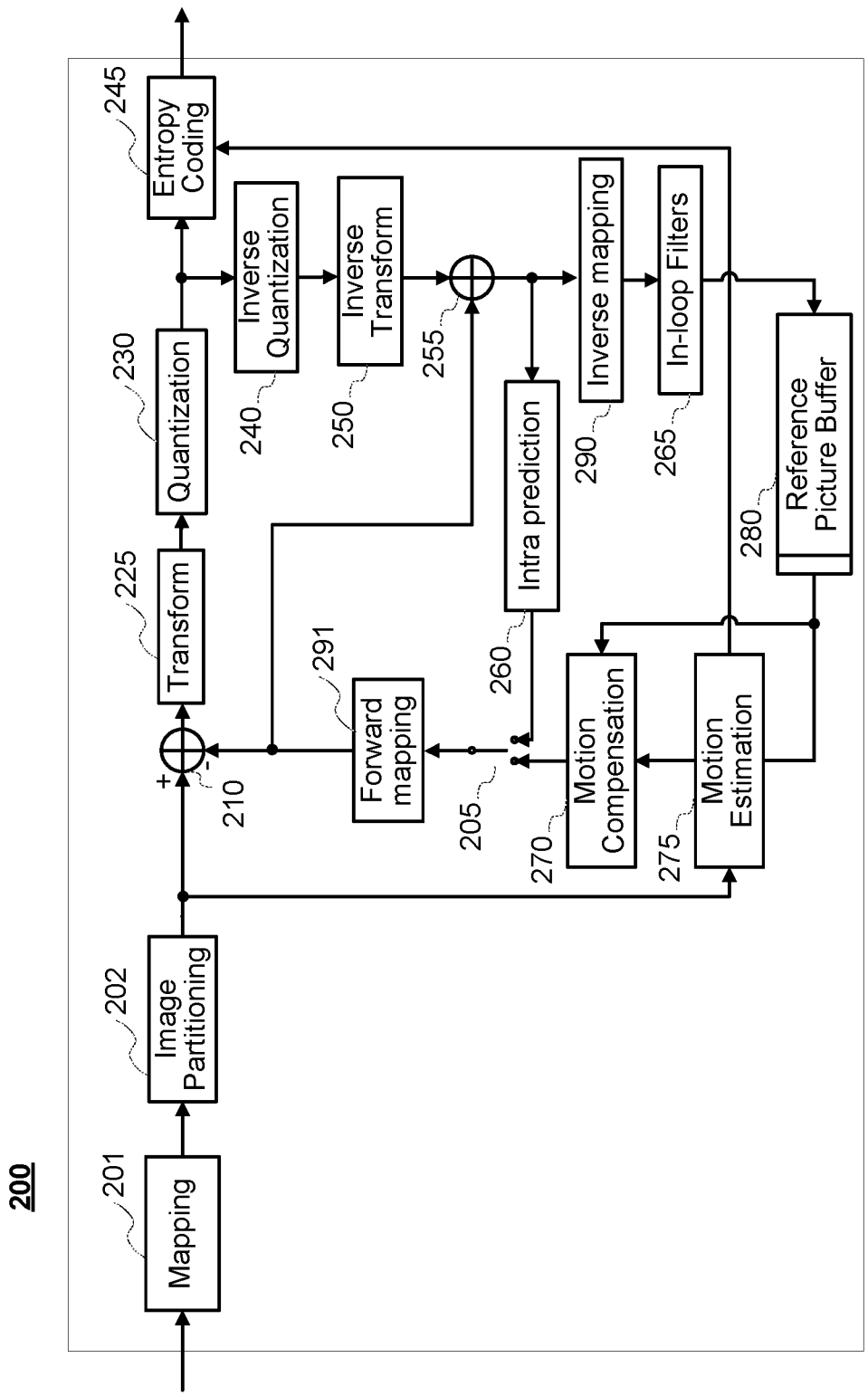
FIG. 2 illustrates a block diagram of an embodiment of a video encoder.

FIG. 2 illustrates an example of a video encoder 200, such as a High Efficiency Video Coding (HEVC) encoder, with the addition of the reshaping process. FIG. 2 may also illustrate an encoder in which improvements are made to the HEVC standard or an encoder employing technologies similar to HEVC, such as a VVC (Versatile Video Coding) encoder under development by JVET (Joint Video Exploration Team).

In the present application, the terms "reconstructed" and "decoded" may be used interchangeably, the terms "encoded" or "coded" may be used interchangeably, and the terms "image", "picture" and "frame" may be used interchangeably. Usually, but not necessarily, the term "reconstructed" is used at the encoder side while "decoded" is used at the decoder side.

Before being encoded, the video sequence may go through pre-encoding processing, for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata may be associated with the pre-processing, and attached to the bitstream.

In HEVC, to encode a video sequence with one or more pictures, a picture is partitioned into one or more slices where each slice may include one or more slice segments. A slice segment is organized into coding units, prediction units, and transform units. The HEVC specification distinguishes between "blocks" and "units," where a "block" addresses a specific area in a sample array (e.g., luma, Y), and the "unit" includes the collocated blocks of all encoded color components (e.g., Y, Cb, Cr, or monochrome), syntax elements, and prediction data that are associated with the blocks (e.g., motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" may be used to refer, for example, to any of CTU, CU, PU, TU, CB, PB, and TB. In addition, the "block" may also be used to refer to a macroblock and a partition as specified in H.264/AVC or other video coding standards, and more generally to refer to an array of data of various sizes.

In the encoder 200, a picture is encoded by the encoder elements as described below. The input signals are mapped (201). The mapping in 201 may correspond to the forward mapping in 291, or further includes other mappings for pre-processing. The picture to be encoded is processed in units of CUs (202). Each CU is encoded using either an intra or inter mode. When a CU is encoded in an intra mode, it performs intra prediction (260). In an inter mode, motion estimation (275) and compensation (270) are performed. The forward mapping (291) is applied to the predicted signals. The encoder decides (205) which one of the intra mode or inter mode to use for encoding the CU, and indicates the intra/inter decision by a prediction mode flag. Prediction residuals are calculated by subtracting (210) the mapped predicted block (from step 291) from the mapped original image block (from step 201).

The prediction residuals are then transformed (225) and quantized (230). The quantized transform coefficients, as well as motion vectors and other syntax elements, are entropy coded (245) to output a bitstream. The encoder may also skip the transform and apply quantization directly to the non-transformed residual signal on a 4×4 TU basis. The encoder may also bypass both transform and quantization, i.e., the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (240) and inverse transformed (250) to decode prediction residuals. Combining (255) the decoded prediction residuals and the predicted block, an image block is reconstructed. Inverse mapping (290) and in-loop filters (265) are applied to the reconstructed signal, for example, to perform deblocking/SAO (Sample Adaptive Offset) filtering to reduce encoding artifacts. The filtered image is stored at a reference picture buffer (280).

Figure 3:
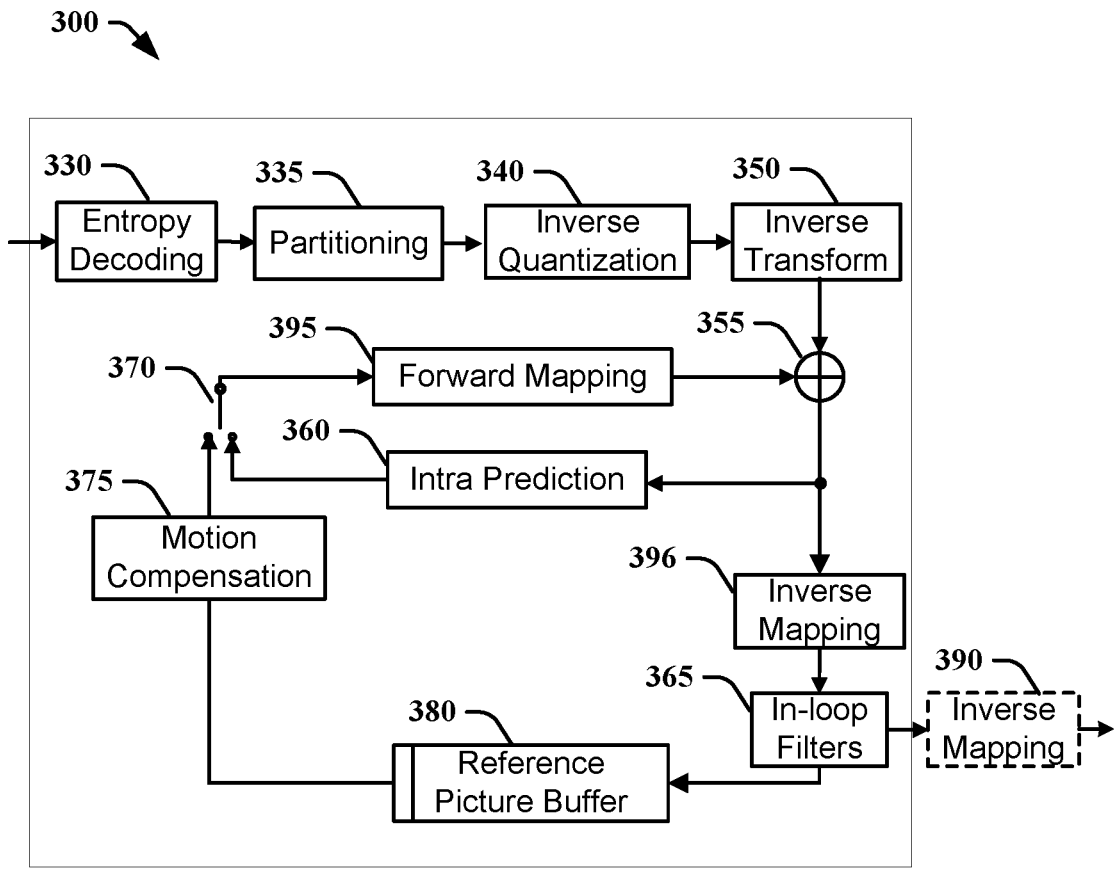
FIG. 3 illustrates a block diagram of an embodiment of a video decoder.

FIG. 3 illustrates a block diagram of an example of a video decoder 300, such as an HEVC decoder, with the addition of the reshaping process. In the decoder 300, a bitstream is decoded by the decoder elements as described below. Video decoder 300 generally performs a decoding pass reciprocal to the encoding pass as described in FIG. 2, which performs video decoding as part of encoding video data. FIG. 3 may also illustrate a decoder in which improvements are made to the HEVC standard or a decoder employing technologies similar to HEVC, such as a VVC decoder.

In particular, the input of the decoder includes a video bitstream, which may be generated by video encoder 200. The bitstream is first entropy decoded (330) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (335) the picture into CTUs, and each CTU into CUs, according to the decoded picture partitioning information. The transform coefficients are de-quantized (340) and inverse transformed (350) to decode the prediction residuals.

Combining (355) the decoded prediction residuals and the predicted block, an image block is reconstructed. The predicted block may be obtained (370) from intra prediction (360) or motion-compensated prediction (i.e., inter prediction) (375). Also the forward mapping (395) is applied to the predicted signals. In case of bi-prediction, two motion compensated predictions may be combined with a weighted sum. Inverse mapping (396) and in-loop filters (365) are applied to the reconstructed signal. The filtered image is stored at a reference picture buffer (380).

The output from the in-loop filters may go through inverse mapping (390) that performs the inverse of the mapping process (201) performed in the pre-processing. The decoded picture can further go through other post-decoding processing, for example, an inverse color transform (e.g., conversion from YCbCr 4:2:0 to RGB 4:4:4). The post-decoding processing may use metadata derived in the pre-encoding processing and signaled in the bitstream.

As described above, WET-L0247 describes an in-loop reshaping process. In particular, the mapping function implementation in WET-L0247 is based on a scaling table, scale[k], k=0 to N−1, N being a power of 2 (typically 16 or 32). Each scale applies to a range of luma values. The range R is fixed and power of 2 ($R=2^K$), and is equal to the full luma range (rangeY) divided by N. For instance, for a 10-bit luma signal, and for N=16, $R=1024/N=64=2^6$ (K=6). The mapping function fwdMap is conceptually defined as follows:

fwdMap[0]=0

Then values at each k*R index, for k=0 to N−1, are computed as follows:

fwdMap[(k+1)*R]=fwdMap[k*R]+R*scale[k]

Note that equivalently, scale[k] corresponds to 1/R* (fwdMap[(k+1)*R]−fwdMap[k*R])

The intermediate values at indexes x=(k*R+1) to ((k+1)*R−1), are linearly interpolated from their surrounding values fwdMap[(k+1)*R] and fwdMap[k*R] as follows:

fwdMap[x]=fwdMap[k*R]+(x−k*R)*(fwdMap[(k+1)*R]−fwdMap[k*R])/R

Figure 4:
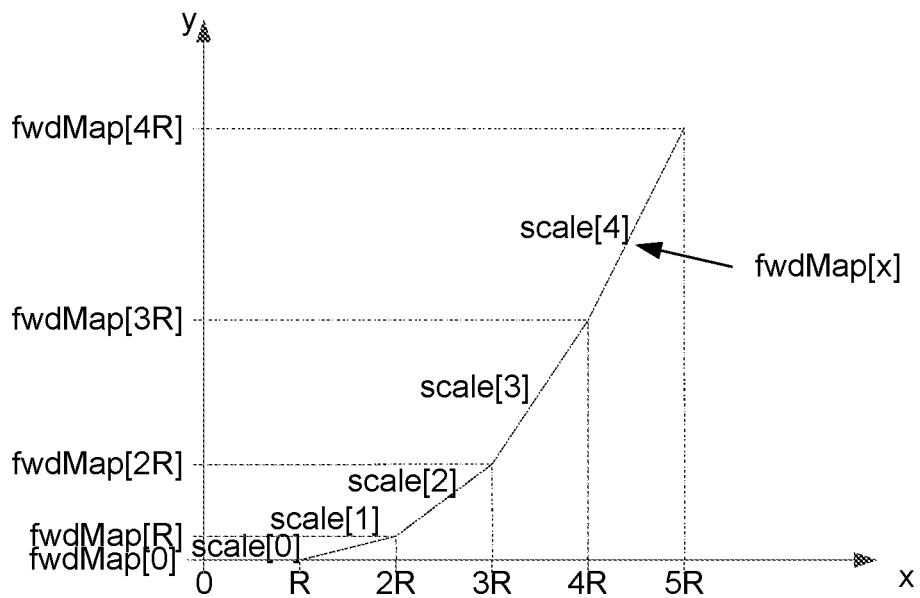
FIG. 4 is a pictorial example illustrating the construction of a forward mapping function.

The process is illustrated in FIG. 4. Each scale is associated with a segment of the piece-wise linear mapping function. Each segment is specified on a luma range of a same length (R). Note that this process requires that the LUT fwdMap has (rangeY+1) elements, from Y=0 to rangeY, even if the actual maximum sample value Y is equal to (rangeY−1).

The advantage of using equi-length intervals, of length R, is that the mapping of a sample value Y can be easily performed on-the-fly by a simple access to look-up-tables of limited size (size N), using an index computed from the value Y shifting by K bits. This process is conceptually as follows:

Computation of the index k=Y/R=Y>>K

Ymap=scale[k]*Y+A[k], where A is a pre-built look-up-table of size N, derived as follows (for k=0 to N−1):

A[k]=fwdMap[k*R]−k*R*scale[k]

Figure 5:
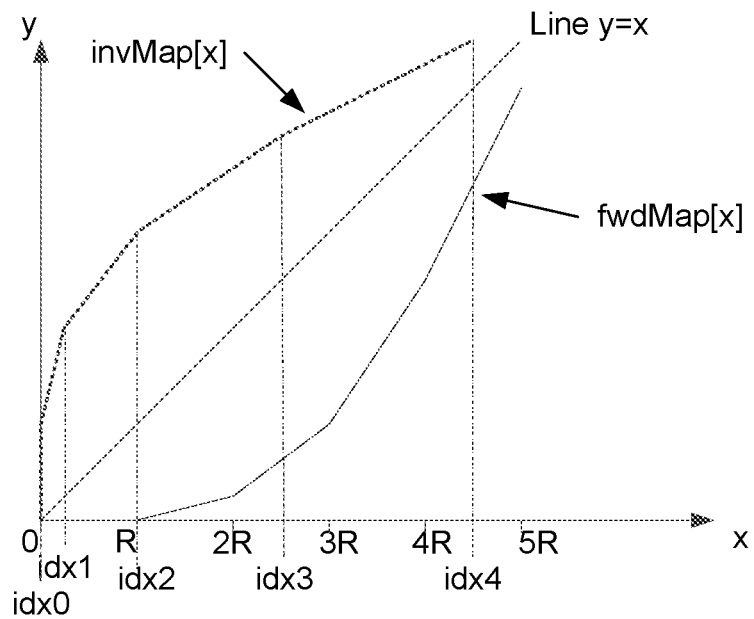
FIG. 5 is a pictorial example illustrating the construction of an inverse mapping function.

The inverse mapping function invMap is built as the inverse of the forward mapping function. It is mathematically built as the symmetric function of fwdMap related to the line defined by the equation y=x, as illustrated in FIG. 5. An issue with such inverse mapping is that it cannot be applied on-the-fly as easily as the forward mapping. Indeed, even if the inverse mapping function remains piece-wise linear, the identification of the index of the piece which a value Y belongs to is not straightforward. Contrarily to the forward mapping case, where a simple shifting operation can be applied, this is more complicated for the inverse mapping case because the indexes of the pieces of the inverse mapping function are not multiple of a pre-defined length that is power of 2. This is illustrated in FIG. 5 where the indexes of the pieces of the inverse mapping functions ($idx_0$ to $idx_4$) are not equi-distantly distributed along the horizontal axis since by construction $idx_k$=fwdMap[k*R].

To perform the inverse mapping, there exist different solutions. In the following, two solutions are described.

Solution 1

The complete look-up-table invMap[x], for x=0 to rangeY−1, where rangeY is the full luma range (e.g., 1024 for a 10-bit luma signal) is initially built at the encoder and at the decoder from the forward mapping function, by mathematic symmetry related to the line defined by the equation y=x. Then for each sample to inverse map, Y, its inverse mapped version Ymap is derived as:

Ymap=invMap[Y], where Y belongs to the range [0, rangeY−1]

This process requires a per-sample access to a look-up-table (LUT) of large size, which may be problematic for implementations. A per-sample access to look-up-tables of 1024 elements is generally considered as problematic. Typically, a maximum LUT size of 32 or 64 elements is considered as acceptable, and 16 or less is usually preferred.

Solution 2

An alternative solution is to identify on-the-fly the index which the sample value Y belongs to, and to perform the inverse mapping using the inverse scale and offset values of index $idx_k$, associated with the interval [$idx_k$, $idx_{k+1}$]. To this end, it is necessary to perform a process equivalent to the following process (in pseudo-code):

k=0 while (Y<)

k=k+1

The index of the interval containing Y is identified as $idx_k$.

This requires multiple checks for each sample value Y. This can also be an issue for actual implementations. For instance, consider a case with M=8, and indexes set IdxTab={idx0=0, idx1=200, idx2=300, idx3=500, idx4=600, idx5=700, idx6=800, idx7=900, idx8=1024}. For any sample value Y larger than 900, (M−1) checks are required. Even with better implementations, having to perform several checks per samples may be problematic.

In one embodiment, the present methods aim at simplifying the inverse mapping process, by converting the inverse mapping function to a piece-wise linear function with equi-length intervals, with a length at power of 2. Hence, it will be possible to perform the inverse mapping on-the-fly by a simple process, as described above for the forward mapping. The disclosed techniques can apply generically to video content (e.g., SDR, HDR), but it is particularly applicable when forward mapping and inverse mapping processes are used in the encoder and decoder to achieve improved coding performance.

Advantageously, this process may enable a simple implementation of the per-sample inverse mapping process, using simple shifting operations and access to look-up-table of a limited size (e.g., below 64 elements). Thus, the proposed techniques may simplify the design of the inverse mapping process while preserving most of the potential coding gains from reshaping (i.e., forward mapping, inverse mapping of the signal).

Figure 6:
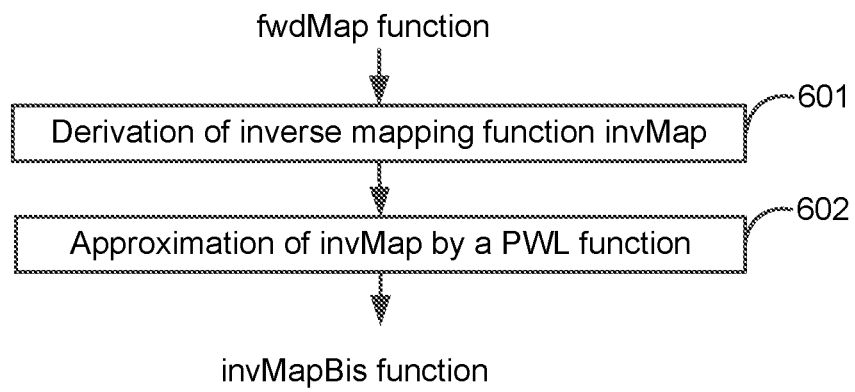
FIG. 6 illustrates a process of inverse mapping function simplification, according to an embodiment.

The process of inverse mapping function generation according to an embodiment is illustrated in FIG. 6. It uses as input the data characterizing the forward mapping function. This can be made of the function fwdMap, or of the scaling table scale[ ]. From this input data, the inverse mapping function invMap is built in step 601. This can be achieved as described before by a mathematical symmetry related to the line y=x, of the forward mapping function fwdMap. An approximation of the inverse mapping function invMap is generated in step 602. This approximation can use a piece-wise linear model of the function, where each piece is defined per equi-length interval, the intervals being of same length equal to a power of 2.

Specification of the Approximated Inverse Mapping Function

The approximate inverse mapping function, noted invMapBis, can be specified by:
- a look-up table size M, where M is a power of 2, lower than rangeY.
- an initial offset value invMapBis[0].
- a table of inverse scale values invScale[k], k=0 to (M−1).

The length of the intervals of the piece-wise linear function invMapBis, noted Rinv, is computed as Rinv=rangeY/M. It is a power of 2, Rinv=$2^{Kinv}$. Note that in some examples, M is set to be greater than or equal to N (the number of segments in the forward mapping function) to have more precision for the inverse mapping than for the forward mapping and to guarantee that concatenating both operations (forward mapping then inverse mapping) in an operation close to the identity function (invMapBis[fwdMap[x]] is close to x). In those examples, Rinv is lower than or equal to R, and therefore Kinv is lower than or equal to K.

is linear per piece of interval length Rinv. The slope of each piece k corresponds to invScale[k] (shown only for pieces 0, 2, 7 in the figure).

Derivation of the Approximated Inverse Mapping Function

In an embodiment, step 602 for constructing the approximate inverse function invMapBis is achieved as follows:
For k=0 to M−1
  invMapBis[(k+1)*Rinv]=invMapBis[k*Rinv]+Rinv*invScale[k]
  intermediate values at indexes x=(k*Rinv+1) to ((k+1)*Rinv−1), are linearly interpolated from their surrounding values invMapBis[(k+1)*Rinv] and invMapBis[k*Rinv] as follows:
  For x=(k*Rinv+1) to ((k+1)*Rinv−1)

$$invMapBis[x]=invMapBis[k*Rinv]+(x-k*Rinv)*(invMapBis[(k+1)*Rinv]-invMapBis[k*Rinv])/Rinv \quad \text{(eq. 6)}$$

Note that this process requires that the LUT invMapBis has (rangeY+1) elements, from Y=0 to rangeY, even if the actual maximum sample value Y is equal to (rangeY−1).

Simplified On-the-Fly Inverse Mapping

The inverse mapping can be achieved by applying the complete LUT invMapBis:
  Yinvmap=invMapBis[Y]

Nevertheless, instead of using the complete LUT invMapBis, the inverse mapping of a sample Y can be easily performed on-the-fly by a simple access to look-up-tables of a limited size (size M), using an index computed from the value Y shifting by Kinv bits. This process is as follows:
  Computation of the index k=Y/Rinv=Y>>Kinv.
  Yinvmap=invScale[k]*Y+Ainv[k], where Ainv is a pre-built look-up-table of size M, derived as follows (for k=0 to M−1):
  Ainv[k]=invMapBis[k*Rinv]−k*Rinv*invScale[k].

This implementation is more efficient and simpler to implement than the two solutions (Solution 1, Solution 2) as described before.

Parameters Used to Define the Approximate Inverse Mapping Function

In an embodiment, the initial offset value invMapBis[0] is set to startPt, where (startPt+1) is the first index for which fwdMap is non-zero. In other words, startPt is such that, for any x<startPt, fwdMap[x]=0.

In an embodiment, the value of invScale[k] is derived as follows:
  invScale[k]=1/Rinv*(invMap[(k+1)*Rinv]−invMap[k*Rinv]),
  where Rinv=rangeY/M.

Figure 8:
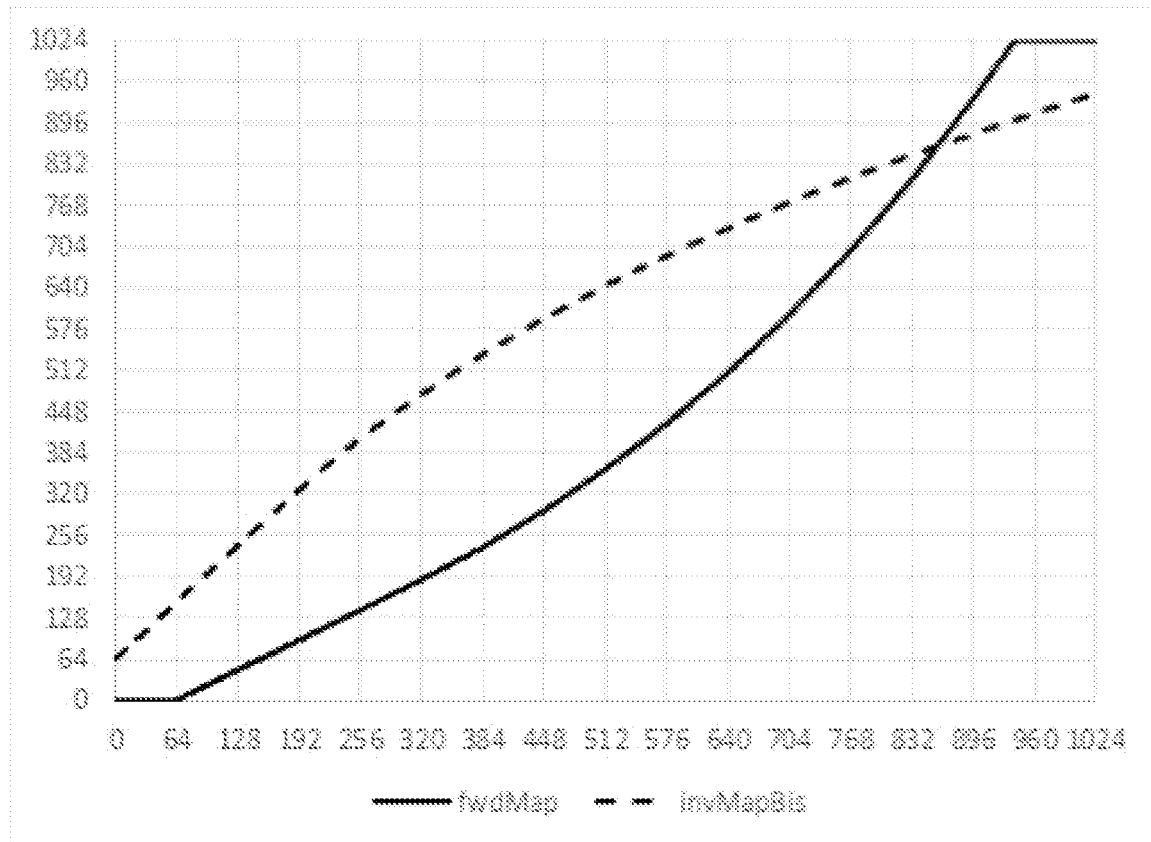
FIG. 8 is a pictorial example illustrating an example of forward mapping and inverse mapping functions.

An example of scale and invScale values is given below (tables typically used for HDR content). The corresponding functions (LUTs) fwdMap and invMapBis are also depicted in FIG. 8.

| k | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| scale[k] | 0 | 47 | 46 | 47 | 47 | 50 | 57 | 64 | 71 | 79 | 89 | 100 | 110 | 125 | 133 | 0 |

Figure 7:
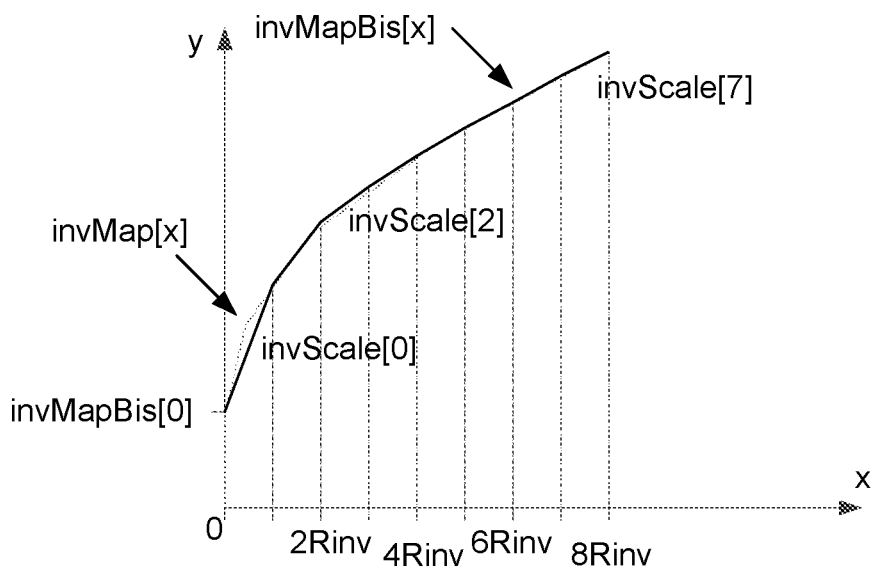
FIG. 7 is a pictorial example illustrating an approximation of an inverse mapping function.

An example is illustrated in FIG. 7, where the inverse mapping function, invMap, is indicated in a dashed line, and the approximated version, invMapBis, is in a solid line and the table contains 16 elements (N=16), and all values are multiplied by R=64 (neutral value representing a scaling of 1.0)

| | k | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| invScale[k] | 43 | 45 | 44 | 44 | 43 | 43 | 42 | 38 | 35 | 33 | 32 | 30 | 28 | 28 | 25 | 26 |

| | k | | | | | | | | | | | | | | | |
|---|---|---|---|---|---|---|---|---|---|---|---|---|---|---|---|---|
| | 16 | 17 | 18 | 19 | 20 | 21 | 22 | 23 | 24 | 25 | 26 | 27 | 28 | 28 | 30 | 31 |
| invScale[k] | 23 | 23 | 22 | 20 | 21 | 20 | 19 | 18 | 19 | 17 | 16 | 16 | 17 | 15 | 16 | 15 | the table contains 32 elements (M=32), and all values are multiplied by Rinv=32 (neutral value representing a scaling of 1.0)

Improving the Approximate Inverse Function

In an embodiment, step 602 includes an improvement process applied iteratively to reduce the overall error of applying the forward mapping then the inverse mapping. This process is performed at the encoder if the inverse function is explicitly signaled, or at the decoder if the inverse function is derived. The process results in modifying the table invScale.

Figure 9:
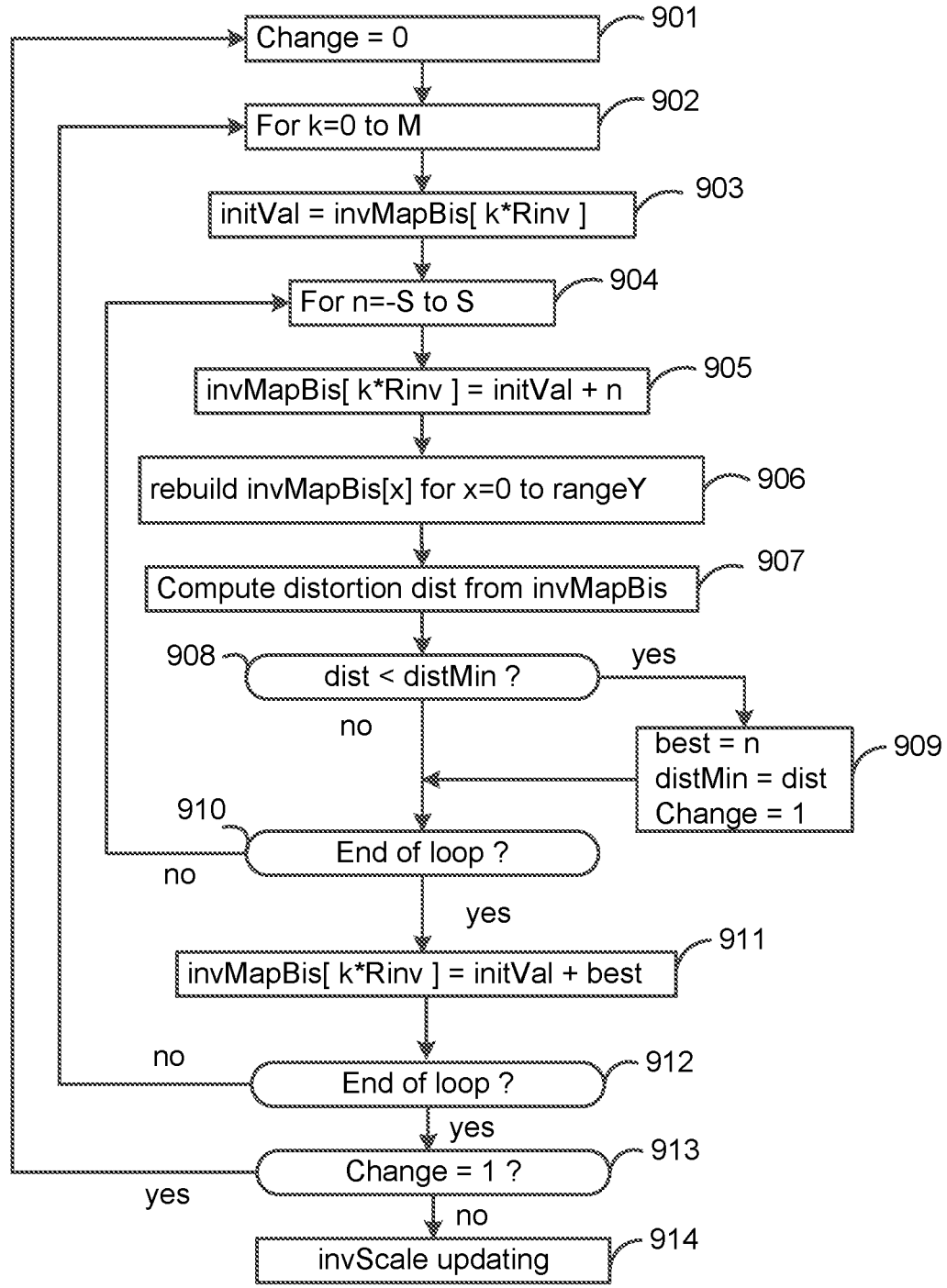
FIG. 9 illustrates a process to improve the approximate inverse mapping function, according to an embodiment.

FIG. 9 illustrates an improvement process according to this embodiment. Initially, a variable distMin is initialized to a very large value, and a variable Change is initialized to 0 in step 901. A loop over a variable k, from 0 to M, is performed in step 902. A variable initVal is initialized to invMapBis[k*Rinv], for example, as described in section "Derivation of the approximated inverse mapping function," in step 903.

A loop over a variable n, from −S to +S, is performed in step 904. Typically, S is set to 2. invMapBis[k*Rinv] is set to (initVal+n) in step 905. The inverse mapping function invMapBis is rebuilt with the modified value invMapBis[k*Rinv] in step 906, as explained in section "Derivation of the approximated inverse mapping function" (see (eq. 6)). A distortion metric dist is computed using the modified function invMapBis in step 907.

Step 908 checks if dist is lower than distMin. If dist is lower than distMin, in step 909, a variable best is set to n, distMin is set to dist, and Change is set to 1. If dist is not lower than distMin, the process goes to step 910. In step 910, it is checked if the end of the loop of step 904 is reached. If the end of the loop of step 904 is not reached, the process goes back to step 904. If the end of the loop of step 904 is reached, invMapBis[k*Rinv] is set to (initVal+best) in step 911. In step 912, it is checked if the end of the loop of step 902 is reached. If the end of the loop of step 902 is not reached, the process goes back to step 902. If the end of the loop of step 902 is reached, it is checked in step 913 if Change is equal to 1. If Change is equal to 1, the process goes back to step 901. If Change is not equal to 1, the process ends by updating the table of invScale (step 914), as follows:

for k=0 to M−1,
    invScale[k]=1/Rinv*(invMapBis[(k+1)*Rinv]−invMapBis[k*Rinv]).

The distortion (used in steps 907, 908) can be computed as follows:

$$dist = \sum_{Y=y0}^{y1} error(Y)^2$$

where error(Y), y0 and y1 are defined as follows:
    error(Y)=Y−invMapBis[fwdMap[Y]].
y0 is computed as follows
    y0=0
    while (fwdMap [y0+1]==fwdMap [y0]), y0=y0+1.
y1 is computed as follows
    y1=rangeY−1
    while (fwdMap [y1−1] fwdMap [y1]), y1=y1−1.
Alternatively, error(Y), y0 and y1 can be defined as follows:
    error(Y)=invMapBis[Y]−invMap[Y].
    y0=0 and y1=rangeY−1.

Inferring the Approximate Inverse Mapping Function at the Decoder

In an embodiment, the approximate inverse mapping function is derived at the decoder. The number of pieces of the function is signalled in the bitstream. This is indicated in the syntax table below (in italics). The rest of the syntax corresponds to the signalling of the forward mapping function. A new syntax element, reshaper_model_inv_ log 2_size, is introduced to specify the number of pieces of the inverse mapping function. Referring to the notations used in this document, M is derived as follows:

$$M = 2^{reshaper\_model\_inv\_log2\_size} =$$
(1<<reshaper_model_inv_ log 2_size).

| | descriptor |
|---|---|
| reshaper_model( ) { | |
|   slice_reshaper_model_present_flag | u(1) |
|   if (slice_reshaper_model_present_flag) { | |
|     reshaper_model_min_bin_idx | u(v) |
|     reshaper_model_max_bin_idx | u(v) |
|     reshaper_model_bin_delta_abs_cw_prec_minus1 | u(v) |
|     for (i = reshaper_model_min_bin_idx; i ≤ reshaper_model_max_bin_idx; i ++) { | |
|       reshape_model_abs_CW | u(v) |
|       reshape_model_sign_CW | u(1) |
|       reshapeModelScale[ i ] = reshape_model_abs_CW * (1 − 2* reshape_model_sign_CW) | |
|     } | |
|     *reshaper_model_inv_log2_size* | u(2) |
|   } | |
| } | |

In an embodiment, this parameter is a factor to be applied to the number of pieces N used to model the forward mapping function:

$$M = N * 2^{reshaper\_model\_inv\_log2\_size} =$$
(N<<reshaper_model_inv_ log 2_size).

In this embodiment, the value of the number of pieces (M) is determined at the encoder. For example, it can be determined in order to guarantee that the distortion dist described above is below a given threshold (e.g., T*rangeY$^2$, with T=0.02). This can be achieved iteratively, starting with M=N. The approximate inverse mapping function is first generated with this value M. If the distortion dist obtained with the resulting approximate inverse mapping function is above the threshold (T*rangeY$^2$), M is doubled (M is set to (M*2)) and the process is re-iterated, until the distortion dist is below the threshold (T*rangeY$^2$), or until M reaches a maximum value Mmax (e.g., 128). Alternatively, M can be set arbitrarily based on practical experiments. In our experiments, it was observed that a value of 32 is in most cases relevant.

From the number of pieces (M), the approximate inverse function can be derived at the decoder as described before.

Signalling the Approximate Inverse Mapping Function

In an embodiment, the approximate inverse mapping function is explicitly signalled in the bitstream. This is indicated in the syntax table below (in italics). The rest of the syntax corresponds to the signalling of the forward mapping function.

At the encoder side, the table invScale, its size M and the first value of invMapBis (invMapBis[0]) are derived from the forward mapping function fwdMap. This is typically achieved according to the process described above, for example, by (1). deriving the inverse mapping function invMap from the forward mapping function fwdMap, (2). generating the approximate inverse mapping function invMapBis from the inverse mapping function invMap (in this step, M can be arbitrarily chosen, or adaptively computed as described above), (3). deriving the table invScale from the approximate inverse mapping function invMapBis. invMapBis is used to perform the inverse mapping in the encoder. Then the encoder encodes in the bitstream the parameters characterizing the approximate mapping function, for example, M, invMapBis[0], the table invScale, following the syntax described in the table below.

At the decoder side, the parameters characterizing the approximate inverse mapping function are decoded from the bitstreams, following the syntax described in the table below. The approximate inverse mapping function invMapBis is then derived from those parameters. invMapBis is used to perform the inverse mapping in the decoder. Alternatively, invMapBis does not need to be built, and the inverse mapping is performed on-the-fly as described in section "Simplified on-the-fly inverse mapping".

The added syntax elements (in italics) in the following syntax table indicate:

The number of pieces of the inverse mapping function, which can be derived from the syntax element reshaper_model_inv_ log 2_size as follows:
reshaperModelInvSize=1<<reshaper_model_inv_ log 2_size or
reshaperModelInvSize=N<<reshaper_model_inv_ log 2_size The offset value of the inverse mapping function reshaper_model_inv_offset (corresponding to invMapBis[0] in the text above).

The scaling values reshapeModelInvScale[i] (sign: reshape_model_sign_CW, absolute value: reshape_model_abs_CW).

|  | descriptor |
|---|---|
| reshaper_model( ) { |  |
|   slice_reshaper_model_present_flag | u(1) |
|   if (slice_reshaper_model_present_flag) { |  |
|     reshaper_model_min_bin_idx | u(v) |
|     reshaper_model_max_bin_idx | u(v) |

-continued

|  | descriptor |
|---|---|
|     reshaper_model_bin_delta_abs_cw_prec_minus1 | u(v) |
|     for (i= reshaper_model_min_bin_idx; i<= reshaper_model_max_bin_idx; i++) { |  |
|       reshape_model_abs_CW | u(v) |
|       reshape_model_sign_CW | u(1) |
|       reshapeModelScale[ i ] = reshape_model_abs_CW * (1 − 2* reshape_model_sign_CW) |  |
|     } |  |
|     *reshaper_model_inv_log2_size* | u(2) |
|     *reshaper_model_inv_offset* | u(2) |
|     *for (i= 0; i<= reshaperModelInvSize ; i++) {* |  |
|       *reshape_model_abs_CW* | u(v) |
|       *reshape_model_sign_CW* | u(1) |
|       *reshapeModelInvScale[ i ] = reshape model abs CW * (1 − 2* reshape model sign CW)* |  |
|     } |  |
|   } |  |
| } |  |

In another embodiment, the offset value reshaper_model_inv_offset is not coded but inferred from the forward function. reshaper_model_inv_offset (invMapBis[0]) is set equal to y0, where y0 is the first value for which fwdMap[y0] is different from fwdMap[y0+1].

The parameters reshapeModelInvScale[i] can be coded differentially with respect to a neutral value (e.g., Rinv) or with respect to the previously coded value reshapeModelInvScale[i−1]. A mix of both approaches can be used:

For the first element (i=0), reshapeModelInvScale[0] is coded differentially with respect to a neutral value (e.g., Rinv).

For the next elements (i>0), reshapeModelInvScale[i] is coded differentially with respect to the previously coded value reshapeModelInvScale[i−1].

In another embodiment, the encoder derives the table invMap from the table fwdMap, then performs an initialization of the table invScale (noted invScaleInit) as explained before by the following operation:

for k=0 to M−1, invScaleInit[k]=1/Rinv*(invMap[(k+1)*Rinv]−invMap[k*Rinv]).

Then the encoder improves this table and derives the table invMapBis, by e.g., the process described in section "Improving the approximate inverse function". The final table invScale is derived as:

for k=0 to M−1, invScale[k]=1/Rinv*(invMapBis[(k+1)*Rinv]−invMapBis[k*Rinv]).

The parameters reshapeModelInvScale[k], for any k=0 to M−1, can be coded as the difference between the initial table invScaleInit and the final table invScale:

for k=0 to M−1, reshapeModelInvScale[k]=invScale[k]−invScaleInit[k].

The decoder derives the table invMap from the table fwdMap, then derives the initialization of the table invScaleInit as explained before by the following operation:

for k=0 to M−1, invScaleInit[k]=1/Rinv*(invMap[(k+1)*Rinv]−invMap[k*Rinv]).

Then the decoder derives the actual final table invScale as follows:

for k=0 to M−1,
    invScale[k]=invScaleInit[k]+reshapeModelInvScale[k].

Alternatively, the parameters reshapeModelInvScale[k], for any k=0 to M−1, can be coded as the difference between the initial inverse mapping LUT value at index (k*Rinv), that is, InvMap[k*Rinv], and the final inverse mapping LUT value at index (k*Rinv), that is, the value of InvMapBis[k*Rinv]:

for k=0 to M−1,
    reshapeModelInvScale[k]=InvMapBis[k*Rinv]−InvMap[k*Rinv].

Then the decoder derives the actual values InvMapBis[k*Rinv] as follows:

for k=0 to M−1,
    InvMapBis[k]=InvMap[k]+reshapeModelInvScale[k].

Subsequently, the decoder can compute the table invScale as:

for k=0 to M−1,
    invScale[k]=1/Rinv*(invMapBis[(k+1)*Rinv]−invMapBis[k*Rinv]).

This can lead to a reduction of the bit cost of coding the table reshapeModelInvScale, as it is expected that most of the values InvMapBis[i*Rinv] do not significantly differ from InvMap[i*Rinv].

As the different processes described above are in principle implemented using fixed-point implementation, the different formulae used in this application may be adjusted in order to ensure a fixed-point implementation. However, conceptually, the implementation will not differ from what is described in this application.

Case of Prediction Residual Equal to 0

In the case of a prediction residual equal to 0, the equation 2 becomes the following equation:

$$Rec(p)=invMap[fwdMap[Pred(p)]] \qquad (eq. 7)$$

Therefore, the forward mapping followed by the inverse mapping is equivalent to the identity function (noted Id), and it is not necessary to perform these two mapping steps (Rec(p)=Pred(p)).

In an embodiment, in the case of a prediction residual equal to 0 for a given sample position, the forward mapping and inverse mapping steps are skipped for this given sample position.

In an embodiment, in the case of a prediction residual equal to 0 for all samples of a block, the forward mapping and inverse mapping steps are skipped for all the samples of the block.

In an embodiment, the forward mapping and inverse mapping steps are skipped for coding units that are coded with the skip mode (e.g., when referring to the VVC 4 draft specification, document JVET-M1001, with the syntax element cu_skip_flag equal to 1).

In an embodiment, the forward mapping and inverse mapping steps are skipped for blocks for which the Coded Block Flag is equal to 0 (e.g., when referring to the VVC 4 draft specification, document JVET-M1001, with the syntax element cu_cbf equal to 0, indicating all transform coefficients are zero for the current coding unit).

Residual Adjustment

Figure 10:
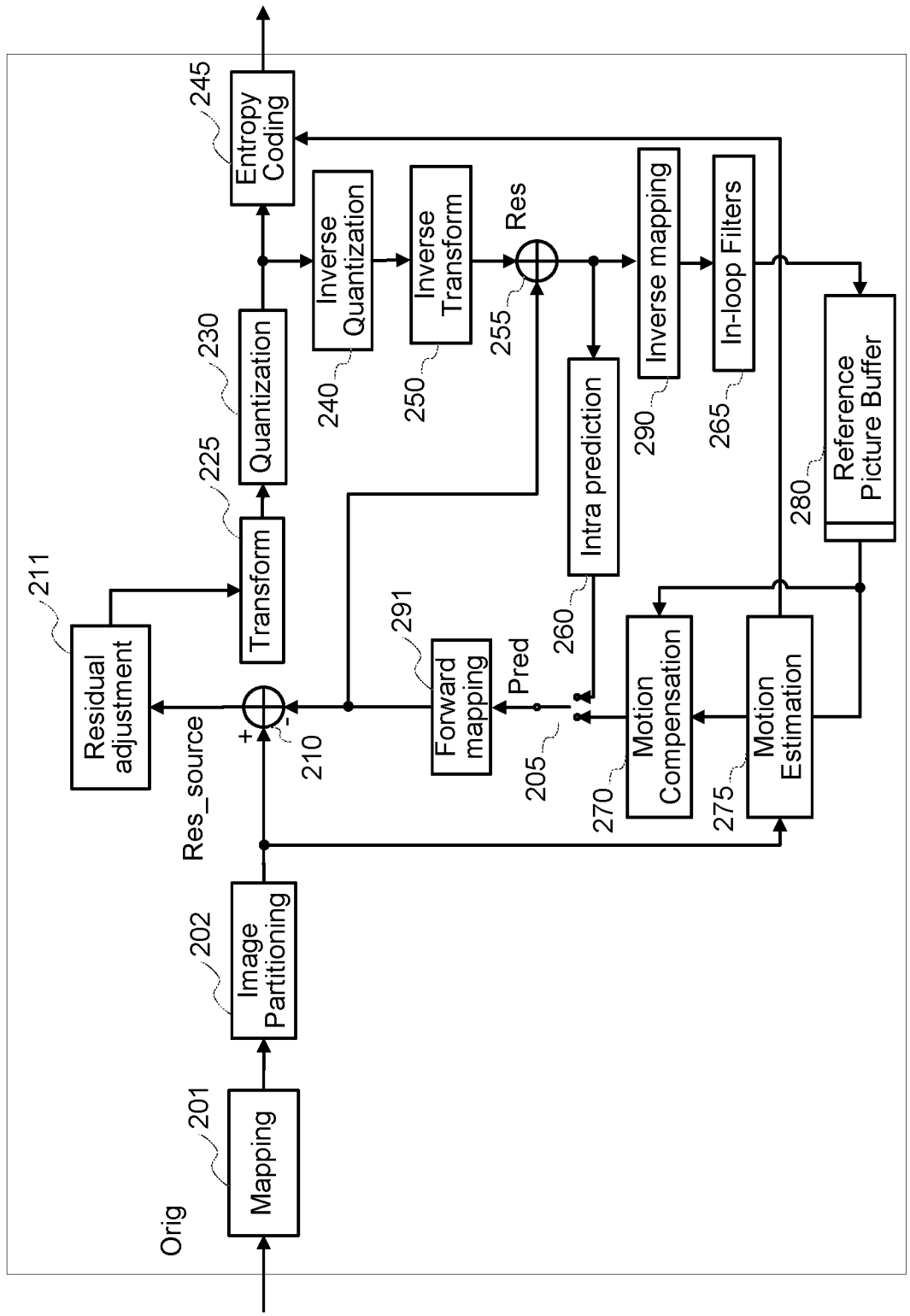
FIG. 10 illustrates a block diagram of another embodiment of a video encoder.

In an embodiment, a step of residual adjustment (step 211 of FIG. 10) is performed at the encoder side between the steps 210 and 225 of FIG. 2.

The step aims at reducing the error resulting from the application of the forward mapping then of the inverse mapping. The error for a given position p is measured as:

$$Error(p)=Orig(p)-invMapBis[fwdMap[Pred(p)]+Res\_source(p)]$$

The closer invMapBis[fwdMap[ ]] corresponds to the exact identify function (Id[ ]), the closer to zero Error(p) should be. However, since invMapBis[ ] is an approximation of the inverse function of fwdMap[ ] and also because of possible rounding errors, invMapBis[fwdMap[ ]] can be different from Id[ ]. To compensate the errors caused by the approximation of inverse mapping function, the residual samples Res_source(p) may be adjusted.

In the residual adjustment step, for a given block under consideration, the residual value Res_source(p) at each sample position p is modified so that abs(Error(p)) or (Error(p))$^2$ is minimal, with abs(x) corresponding to the absolute value of x. In practice, this may consist in scanning a few values around the initial value, and in keeping the one which gives the error with minimum amplitude. The process can be achieved as follows, for each position p of the block under consideration:

- set initVal = Res_source(p)
- compute minError = abs( Error(p) )
- If minError is not equal to 0
    - set bestS = 0
    - For s = −S to S, S being a given value (for example S=2)
        - Set Res_source(p) = initVal + s
        - compute Error(p)
        - if (abs( Error(p) ) < minError)
        - set bestS = s
        - set minError = abs( Error(p) )
- set Res_source(p) = initVal + bestS In an alternate implementation, the error also considers the impact of the transform and quantization. The process works per transform unit, and can be performed as follows:

Apply the transform and quantization to the block of residual values Res_source(p), for all p locations in the block Set minError to a large value Scan each transform coefficient Coef[k], for k=0 to BS−1, BS being the number of transform coefficients in the block under consideration

- set initVal = Coef[k]
- For t = −T to T, T being a given value (for example T=1)
    - Set Coef[k] = initVal + t
    - perform the inverse quantization and inverse transform to the block of coefficients
    - compute the sum of error amplitude over the block
        SumErr = $\Sigma_p$ abs( Error(p) ) , where Res(p) is used for calculating Error (p) instead of Res_source (p)
    - if (SumErr < minError)
        - set bestT = t
        - set minError = SumErr
- set Coef[k] = initVal + bestT In another embodiment, the interval lengths of the inverse mapping function are not power of 2 and can vary from one piece to another piece, as in the default design. But the number of pieces is reduced compared to the forward mapping function. For instance, it is reduced by a factor of 2, in order to reduce the number of checks required to identify the index of the piece which a value that has to be inverse mapped belongs to. This results in a design simplification.

According to this embodiment, it is required to signal the interval length in addition to the value of the scales of the inverse mapping function. An example of the corresponding signaling is provided in the table below. A new syntax element, "reshape_interval_length[i]", is inserted in the syntax. reshape_interval_length[i] represents the length of the $i^{th}$ interval (that is, of the $i^{th}$ piece). These values can be coded differentially to the "default" interval values, derived from the forward function. For instance, the default interval value of the piece i is equal to (fwdMap[(i+1)*Rinv]−fwdMap[i*Rinv]), for i=0 to reshaperModelInvSize.

|  | descriptor |
|---|---|
| reshaper_model( ) { |  |
|   slice_reshaper_model_present_flag | u(1) |
|   if (slice_reshaper_model_present_flag) { |  |
|     reshaper_model_min_bin_idx | u(v) |
|     reshaper_model_max_bin_idx | u(v) |
|     reshaper_model_bin_delta_abs_cw_prec_minus1 | u(v) |
|     for (i= reshaper_model_min_bin_idx; i<= reshaper_model_max_bin_idx; i++) { |  |
|       reshape_model_abs_CW | u(v) |
|       reshape_model_sign_CW | u(1) |
|       reshapeModelScale[ i ] = reshape_model_abs_CW * (1 − 2* reshape_model_sign_CW) |  |
|     } |  |
|     *reshaper_model_inv_log2_size* | u(2) |
|     *reshaper_model_inv_offset* | u(2) |
|     *for (i= 0; i< reshaperModelInvSize ; i++) {* |  |
|       *reshape_interval_length[ i ]* | u(v) |
|     } |  |
|     *for (i= 0; i<= reshaperModelInvSize ; i++) {* |  |
|       *reshape_model_abs_CW* | u(v) |
|       *reshape_model_sign_CW* | u(1) |
|       reshapeModelInvScale[i] = *reshape model abs CW * (1 − 2* reshape model sign CW)* |  |
|     } |  |
|   } |  |
| } |  |

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the inverse mapping modules (290, 291, 390, 396), of a video encoder 200 and decoder 300 as shown in FIG. 2 and FIG. 3. Moreover, the present aspects are not limited to VVC or HEVC, and can be applied, for example, to other standards and recommendations, and extensions of any such standards and recommendations. Unless indicated otherwise, or technically precluded, the aspects described in this application can be used individually or in combination.

Various numeric values are used in the present application, for example, the slopes used in the mapping functions. The specific values are for example purposes and the aspects described are not limited to these specific values.

Figure 11:
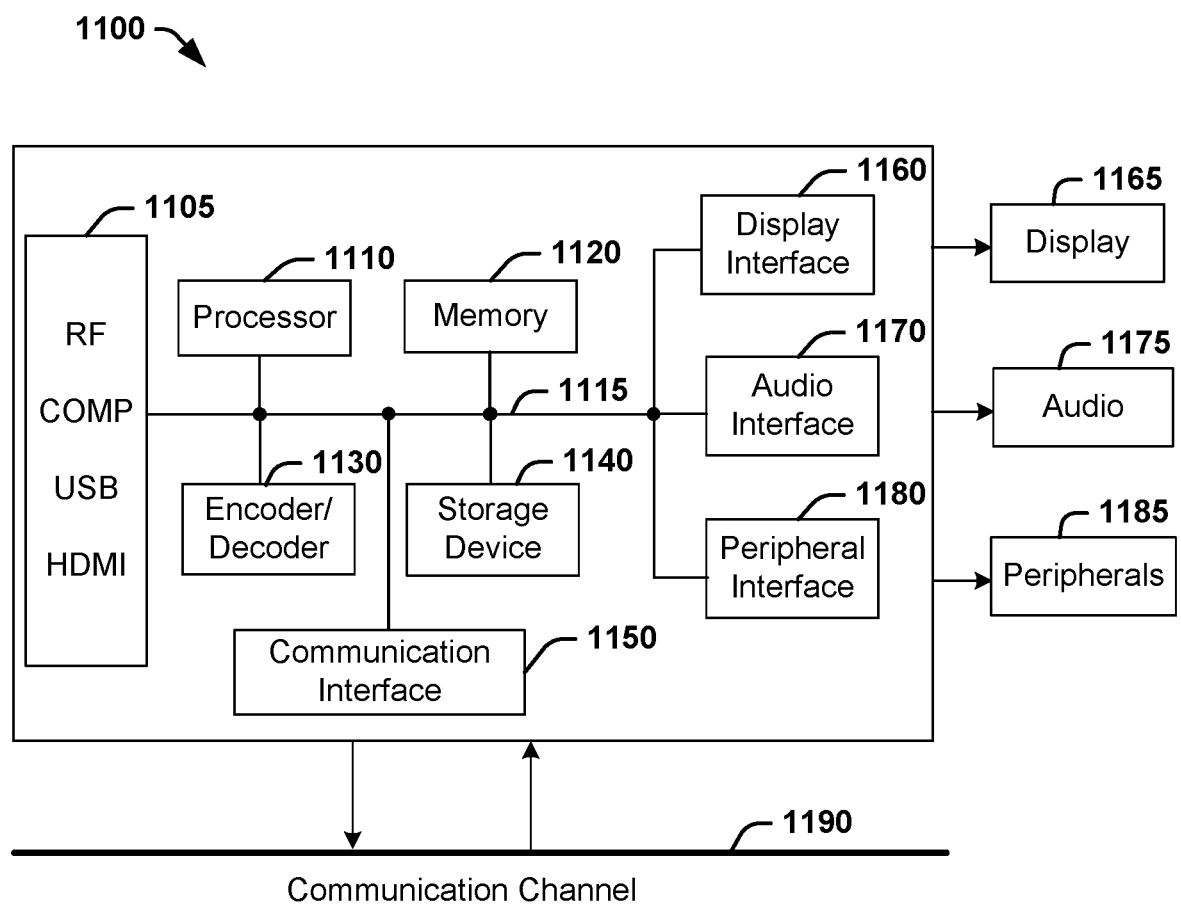
FIG. 11 illustrates a block diagram of a system within which aspects of the present embodiments may be implemented.

FIG. 11 illustrates a block diagram of an example of a system in which various aspects and embodiments are implemented. System 1100 may be embodied as a device including the various components described below and is configured to perform one or more of the aspects described in this application. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1100, singly or in combination, may be embodied in a single integrated circuit, multiple ICs, and/or discrete components. For example, in at least one embodiment, the processing and encoder/decoder elements of system 1100 are distributed across multiple ICs and/or discrete components. In various embodiments, the system 1100 is communicatively coupled to other systems, or to other electronic devices, via, for example, a communications bus or through dedicated input and/or output ports. In various embodiments, the system 1100 is configured to implement one or more of the aspects described in this application.

The system 1100 includes at least one processor 1110 configured to execute instructions loaded therein for implementing, for example, the various aspects described in this application. Processor 1110 may include embedded memory, input output interface, and various other circuitries as known in the art. The system 1100 includes at least one memory 1120 (e.g., a volatile memory device, and/or a non-volatile memory device). System 1100 includes a storage device 1140, which may include non-volatile memory and/or volatile memory, including, but not limited to, EEPROM, ROM, PROM, RAM, DRAM, SRAM, flash, magnetic disk drive, and/or optical disk drive. The storage device 1140 may include an internal storage device, an attached storage device, and/or a network accessible storage device, as non-limiting examples.

System 1100 includes an encoder/decoder module 1130 configured, for example, to process data to provide an encoded video or decoded video, and the encoder/decoder module 1130 may include its own processor and memory. The encoder/decoder module 1130 represents module(s) that may be included in a device to perform the encoding and/or decoding functions. As is known, a device may include one or both of the encoding and decoding modules. Additionally, encoder/decoder module 1130 may be implemented as a separate element of system 1100 or may be incorporated within processor 1110 as a combination of hardware and software as known to those skilled in the art.

Program code to be loaded onto processor 1110 or encoder/decoder 1130 to perform the various aspects described in this application may be stored in storage device 1140 and subsequently loaded onto memory 1120 for execution by processor 1110. In accordance with various embodiments, one or more of processor 1110, memory 1120, storage device 1140, and encoder/decoder module 1130 may store one or more of various items during the performance of the processes described in this application. Such stored items may include, but are not limited to, the input video, the decoded video or portions of the decoded video, the bitstream, matrices, variables, and intermediate or final results from the processing of equations, formulas, operations, and operational logic.

In several embodiments, memory inside of the processor 1110 and/or the encoder/decoder module 1130 is used to store instructions and to provide working memory for processing that is needed during encoding or decoding. In other embodiments, however, a memory external to the processing device (for example, the processing device may be either the processor 1110 or the encoder/decoder module 1130) is used for one or more of these functions. The external memory may be the memory 1120 and/or the storage device 1140, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 1100 may be provided through various input devices as indicated in block 1105. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1105 have associated respective input processing elements as known in the art. For example, the RF portion may be associated with elements suitable for (i) selecting a desired frequency (also referred to as selecting a signal, or band-limiting a signal to a band of frequencies), (ii) down converting the selected signal, (iii) band-limiting again to a narrower band of frequencies to select (for example) a signal frequency band which may be referred to as a channel in certain embodiments, (iv) demodulating the down converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion may include a tuner that performs various of these functions, including, for example, down converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down converting, and filtering again to a desired frequency band. Various embodiments rearrange the order of the above-described (and other) elements, remove some of these elements, and/or add other elements performing similar or different functions. Adding elements may include inserting elements in between existing elements, for example, inserting amplifiers and an analog-to-digital converter. In various embodiments, the RF portion includes an antenna.

Additionally, the USB and/or HDMI terminals may include respective interface processors for connecting system 1100 to other electronic devices across USB and/or HDMI connections. It is to be understood that various aspects of input processing, for example, Reed-Solomon error correction, may be implemented, for example, within a separate input processing IC or within processor 1110 as necessary. Similarly, aspects of USB or HDMI interface processing may be implemented within separate interface ICs or within processor 1110 as necessary. The demodulated, error corrected, and demultiplexed stream is provided to various processing elements, including, for example, processor 1110, and encoder/decoder 1130 operating in combination with the memory and storage elements to process the datastream as necessary for presentation on an output device.

Various elements of system 1100 may be provided within an integrated housing, Within the integrated housing, the various elements may be interconnected and transmit data therebetween using suitable connection arrangement 1115, for example, an internal bus as known in the art, including the I2C bus, wiring, and printed circuit boards.

The system 1100 includes communication interface 1150 that enables communication with other devices via communication channel 1190. The communication interface 1150 may include, but is not limited to, a transceiver configured to transmit and to receive data over communication channel 1190. The communication interface 1150 may include, but is not limited to, a modem or network card and the communication channel 1190 may be implemented, for example, within a wired and/or a wireless medium.

Data is streamed to the system 1100, in various embodiments, using a Wi-Fi network such as IEEE 802.11. The Wi-Fi signal of these embodiments is received over the communications channel 1190 and the communications interface 1150 which are adapted for Wi-Fi communications. The communications channel 1190 of these embodiments is typically connected to an access point or router that provides access to outside networks including the Internet for allowing streaming applications and other over-the-top communications. Other embodiments provide streamed data to the system 1100 using a set-top box that delivers the data over the HDMI connection of the input block 1105. Still other embodiments provide streamed data to the system 1100 using the RF connection of the input block 1105.

The system 1100 may provide an output signal to various output devices, including a display 1165, speakers 1175, and other peripheral devices 1185. The other peripheral devices 1185 include, in various examples of embodiments, one or more of a stand-alone DVR, a disk player, a stereo system, a lighting system, and other devices that provide a function based on the output of the system 1100. In various embodiments, control signals are communicated between the system 1100 and the display 1165, speakers 1175, or other peripheral devices 1185 using signaling such as AV.Link, CEC, or other communications protocols that enable device-to-device control with or without user intervention. The output devices may be communicatively coupled to system 1100 via dedicated connections through respective interfaces 1160, 1170, and 1180. Alternatively, the output devices may be connected to system 1100 using the communications channel 1190 via the communications interface 1150. The display 1165 and speakers 1175 may be integrated in a single unit with the other components of system 1100 in an electronic device, for example, a television. In various embodiments, the display interface 1160 includes a display driver, for example, a timing controller (T Con) chip.

The display 1165 and speaker 1175 may alternatively be separate from one or more of the other components, for example, if the RF portion of input 1105 is part of a separate set-top box. In various embodiments in which the display 1165 and speakers 1175 are external components, the output signal may be provided via dedicated output connections, including, for example, HDMI ports, USB ports, or COMP outputs.

According to an embodiment, a method of video encoding or decoding is provided, comprising: performing forward mapping, based on a forward mapping function, to a prediction sample corresponding to a sample of a block of a picture; and performing inverse mapping, based on an inverse mapping function, to a reconstructed version of said sample of said block, wherein said inverse mapping function is an approximation of an inverse function of said forward mapping function, wherein said inverse mapping function is modelled as a piece-wise linear function, and wherein each piece in said piece-wise linear model is defined with a same interval length.

According to another embodiment, an apparatus for video encoding or decoding is provided, comprising one or more processors, wherein said one or more processors are configured to: perform forward mapping, based on a forward mapping function, to a prediction sample corresponding to a sample of a block of a picture; and perform inverse mapping, based on an inverse mapping function, to a reconstructed version of said sample of said block, wherein said inverse mapping function is an approximation of an inverse function of said forward mapping function, wherein said inverse mapping function is modelled as a piece-wise linear function, and wherein each piece in said piece-wise linear model is defined with a same interval length. The apparatus may further comprise one or more memories coupled to said one or more processors.

According to another embodiment, an apparatus of video encoding or decoding is provided, comprising: means for performing forward mapping, based on a forward mapping function, to a prediction sample corresponding to a sample of a block of a picture; and means for performing inverse mapping, based on an inverse mapping function, to a reconstructed version of said sample of said block, wherein said inverse mapping function is an approximation of an inverse function of said forward mapping function, wherein said inverse mapping function is modelled as a piece-wise linear function, and wherein each piece in said piece-wise linear model is defined with a same interval length.

According to another embodiment, a signal comprising encoded video is formed by performing: performing forward mapping, based on a forward mapping function, to a prediction sample corresponding to a sample of a block of a picture; and performing inverse mapping, based on an inverse mapping function, to a reconstructed version of said sample of said block, wherein said inverse mapping function is an approximation of an inverse function of said forward mapping function, wherein said inverse mapping function is modelled as a piece-wise linear function, and wherein each piece in said piece-wise linear model is defined with a same interval length.

In one embodiment, said reconstructed version of said sample of said block is generated as a sum of (1) said forward mapped prediction sample and (2) inverse quantized and inverse transformed prediction residual corresponding to said sample.

In one embodiment, said interval length in said piece-wise linear model is equal to a power of 2. In another embodiment, the intervals may have different lengths.

In one embodiment, said piece-wise linear model is specified by the number of pieces in said piece-wise linear model, an initial offset value, and slopes for individual pieces in said piece-wise linear model.

In one embodiment, said inverse mapping is further applied to output samples at a decoder.

In one embodiment, said forward mapping is further applied to input samples at an encoder.

In one embodiment, in-loop filtering is applied to filter said inverse mapped reconstructed version of said sample of said block.

According to one embodiment, an encoder or decoder may skip forward mapping and inverse mapping, when one or more of the following conditions are satisfied:

(1) prediction residual corresponding to said sample is zero;

(2) prediction residuals for all samples of said block are zero;

(3) said block is encoded in a skip mode; and (4) a flag indicates that all transform coefficients are zeros for said block.

In one embodiment, the number of pieces in said piece-wise linear model for said inverse mapping function is larger than or equal to the number of pieces of a piece-wise linear function used for said forward mapping function.

In one embodiment, the number of pieces in said piece-wise linear model is indicated in a bitstream.

In one embodiment, said initial offset value and said slopes are indicated in a bitstream.

In one embodiment, slope differences between (1) an initial set of slope values which are to be derived at a decoder and (2) a set of slope values to be used to perform said inverse mapping are indicated in said bitstream.

In one embodiment, one or more parameters for performing said inverse mapping are derived based on said forward mapping function.

In one embodiment, an inverse mapping function is first derived as an inverse function of said forward mapping, then adjusted to said piece-wise linear function.

In one embodiment, prediction residual corresponding to said sample of said block is adjusted before being transformed. In another embodiment, transform coefficient is adjusted before being quantized. In one example, the prediction residual or transform coefficient is adjusted to reduce an error between an original sample and an inverse mapping of a sum of (1) said forward mapped prediction sample and (2) prediction residual corresponding to said sample.

An embodiment provides a computer program comprising instructions which when executed by one or more processors cause the one or more processors to perform the encoding method or decoding method according to any of the embodiments described above. One or more of the present embodiments also provide a computer readable storage medium having stored thereon instructions for encoding or decoding video data according to the methods described above. One or more embodiments also provide a computer readable storage medium having stored thereon a bitstream generated according to the methods described above. One or more embodiments also provide a method and apparatus for transmitting or receiving the bitstream generated according to the methods described above.

Various implementations involve decoding. "Decoding," as used in this application, may encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input video sequence in order to produce an encoded bitstream.

Note that the syntax elements as used herein, for example, syntax used to characterize the inverse mapping functions, are descriptive terms. As such, they do not preclude the use of other syntax element names.

The implementations and aspects described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus, for example, a processor, which refers to processing devices in general, including, for example, a computer, a microprocessor, an integrated circuit, or a programmable logic device. Processors also include communication devices, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals the number of pieces in the piece-wise linear model to the decoder. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A method for video decoding, comprising:
applying forward mapping, based on a forward mapping function, to a prediction sample corresponding to a sample of a block of a picture, wherein said forward mapping function is modelled as a first piece-wise linear function, and wherein each piece in said first piece-wise linear function is defined with a same first interval length; and
applying inverse mapping, based on an inverse mapping function, to a reconstructed version of said sample of said block,
wherein said inverse mapping function is based on an inverse function of said forward mapping function,
wherein said inverse mapping function is modelled as a second piece-wise linear function, and
wherein each piece in said second piece-wise linear function is defined with a same second interval length.

2. The method of claim 1, wherein said second interval length in said second piece-wise linear function is equal to a power of 2.

3. The method of claim 1, wherein said second piece-wise linear function is specified by the number of pieces in said second piece-wise linear function, an initial offset value, and slopes for individual pieces in said second piece-wise linear function.

4. The method of claim 1, wherein said forward mapping and said inverse mapping are skipped responsive to that one or more of the following conditions are satisfied:
(1) prediction residual corresponding to said sample is zero;

(2) prediction residuals for all samples of said block are zero;
(3) said block is encoded in a skip mode; and
(4) a flag indicates that all transform coefficients are zeros for said block.

5. The method of claim 1, wherein one or more parameters for said inverse mapping are derived based on said forward mapping function.

6. An apparatus for video decoding, comprising one or more processors and at least a memory coupled to said one or more processors, wherein said one or more processors are configured to:
apply forward mapping, based on a forward mapping function, to a prediction sample corresponding to a sample of a block of a picture, wherein said forward mapping function is modelled as a first piece-wise linear function, and wherein each piece in said first piece-wise linear function is defined with a same first interval length; and
apply inverse mapping, based on an inverse mapping function, to a reconstructed version of said sample of said block,
wherein said inverse mapping function is based on an inverse function of said forward mapping function,
wherein said inverse mapping function is modelled as a second piece-wise linear function, and
wherein each piece in said second piece-wise linear function is defined with a same second interval length.

7. The apparatus of claim 6, wherein said second interval length in said second piece-wise linear function is equal to a power of 2.

8. The apparatus of claim 6, wherein said second piece-wise linear function is specified by the number of pieces in said second piece-wise linear function, an initial offset value, and slopes for individual pieces in said second piece-wise linear function.

9. The apparatus of claim 6, wherein said forward mapping and said inverse mapping are skipped responsive to that one or more of the following conditions are satisfied:
(1) prediction residual corresponding to said sample is zero;
(2) prediction residuals for all samples of said block are zero;
(3) said block is encoded in a skip mode; and
(4) a flag indicates that all transform coefficients are zeros for said block.

10. The apparatus of claim 6, wherein one or more parameters for said inverse mapping are derived based on said forward mapping function.

11. A method for video encoding, comprising:
applying forward mapping, based on a forward mapping function, to a prediction sample corresponding to a sample of a block of a picture, wherein said forward mapping function is modelled as a first piece-wise linear function, and wherein each piece in said first piece-wise linear function is defined with a same first interval length; and
applying inverse mapping, based on an inverse mapping function, to a reconstructed version of said sample of said block,
wherein said inverse mapping function is based on an inverse function of said forward mapping function,
wherein said inverse mapping function is modelled as a second piece-wise linear function, and
wherein each piece in said second piece-wise linear function is defined with a same second interval length.

12. The method of claim 11, wherein said second interval length in said second piece-wise linear function is equal to a power of 2.

13. The method of claim 11, wherein said second piece-wise linear function is specified by the number of pieces in said second piece-wise linear function, an initial offset value, and slopes for individual pieces in said second piece-wise linear function.

14. The method of claim 11, wherein said forward mapping and said inverse mapping are skipped responsive to that one or more of the following conditions are satisfied:
(1) prediction residual corresponding to said sample is zero;
(2) prediction residuals for all samples of said block are zero;
(3) said block is encoded in a skip mode; and
(4) a flag indicates that all transform coefficients are zeros for said block.

15. The method of claim 11, wherein one or more parameters for said inverse mapping are derived based on said forward mapping function.

16. An apparatus for video encoding, comprising one or more processors and at least a memory coupled to said one or more processors, wherein said one or more processors are configured to:
apply forward mapping, based on a forward mapping function, to a prediction sample corresponding to a sample of a block of a picture, wherein said forward mapping function is modelled as a first piece-wise linear function, and wherein each piece in said first piece-wise linear function is defined with a same first interval length; and
apply inverse mapping, based on an inverse mapping function, to a reconstructed version of said sample of said block,
wherein said inverse mapping function is based on an inverse function of said forward mapping function,
wherein said inverse mapping function is modelled as a second piece-wise linear function, and
wherein each piece in said second piece-wise linear function is defined with a same second interval length.

17. The apparatus of claim 16, wherein said second interval length in said second piece-wise linear function is equal to a power of 2.

18. The apparatus of claim 16, wherein said second piece-wise linear function is specified by the number of pieces in said second piece-wise linear function, an initial offset value, and slopes for individual pieces in said second piece-wise linear function.

19. The apparatus of claim 16, wherein said forward mapping and said inverse mapping are skipped responsive to that one or more of the following conditions are satisfied:
(1) prediction residual corresponding to said sample is zero;
(2) prediction residuals for all samples of said block are zero;
(3) said block is encoded in a skip mode; and
(4) a flag indicates that all transform coefficients are zeros for said block.

20. The apparatus of claim 16, wherein one or more parameters for said inverse mapping are derived based on said forward mapping function.

* * * * *